United States Patent
Bozanich et al.

(10) Patent No.: US 8,250,658 B2
(45) Date of Patent: Aug. 21, 2012

(54) SYNTAX-BASED SECURITY ANALYSIS USING DYNAMICALLY GENERATED TEST CASES

(75) Inventors: Adam Bozanich, San Francisco, CA (US); Kowsik Guruswamy, Sunnyvale, CA (US); Marshall A. Beddoe, San Francisco, CA (US)

(73) Assignee: Mu Dynamics, Inc., Sunnyvale, CA (US)

( * ) Notice: Subject to any disclaimer, the term of this patent is extended or adjusted under 35 U.S.C. 154(b) by 517 days.

(21) Appl. No.: 11/858,779

(22) Filed: Sep. 20, 2007

(65) Prior Publication Data

US 2009/0083854 A1 Mar. 26, 2009

(51) Int. Cl.
G06F 21/00 (2006.01)

(52) U.S. Cl. .................................. 726/25

(58) Field of Classification Search .......... 726/22, 726/23, 24, 25
See application file for complete search history.

(56) References Cited

U.S. PATENT DOCUMENTS

| | | | |
|---|---|---|---|
| 5,485,409 A | 1/1996 | Gupta et al. | |
| 5,892,903 A | 4/1999 | Klaus | |
| 6,574,737 B1 | 6/2003 | Kingsford et al. | |
| 6,584,569 B2 * | 6/2003 | Reshef et al. | 726/25 |
| 6,609,205 B1 | 8/2003 | Bernhard et al. | |
| 6,654,914 B1 | 11/2003 | Kaffine et al. | |
| 7,185,232 B1 | 2/2007 | Leavy et al. | |
| 7,342,892 B2 | 3/2008 | Soon et al. | |
| 7,346,922 B2 | 3/2008 | Miliefsky | |
| 7,509,675 B2 | 3/2009 | Aaron | |
| 7,512,125 B2 | 3/2009 | Betts et al. | |
| 7,607,170 B2 | 10/2009 | Chesla | |
| 2001/0034847 A1 | 10/2001 | Gaul, Jr. | |
| 2006/0021049 A1 | 1/2006 | Cook | |
| 2007/0086389 A1 | 4/2007 | Park et al. | |
| 2007/0094728 A1 | 4/2007 | Julisch et al. | |
| 2007/0174917 A1 | 7/2007 | Guruswamy | |
| 2007/0204347 A1 | 8/2007 | Caceres et al. | |
| 2008/0072322 A1 | 3/2008 | Guruswamy | |
| 2008/0120283 A1 | 5/2008 | Liu et al. | |
| 2008/0282352 A1 | 11/2008 | Beddoe et al. | |

FOREIGN PATENT DOCUMENTS

WO    WO 2006/099536 A2    9/2006

OTHER PUBLICATIONS

Wagner, D. et al., "Intrusion Detection Via Static Analysis," IEEE Symposium on Security and Privacy, 2001, pp. 156-168.

(Continued)

*Primary Examiner* — Gilberto Barron, Jr.
*Assistant Examiner* — Devin Almeida
(74) *Attorney, Agent, or Firm* — K&L Gates LLP (57) ABSTRACT

A security analysis methodology is used to analyze the security of a device-under-analysis (DUA) with respect to a particular protocol message exchange. First, the mutation points that exist in the message exchange are determined. Then, the message exchange is executed multiple times—once for each mutation point. Each execution applies the mutation associated with that particular mutation point (e.g., a particular message during the exchange is modified in a particular way) to create a mutated message exchange. In other words, each message exchange with an applied mutation point corresponds to a test case.

30 Claims, 3 Drawing Sheets

OTHER PUBLICATIONS

Aitel, D., "An Introduction to SPIKE, the Fuzzer Creation Kit" (presentation slides), Aug. 1, 2002, Black Hat USA, Las Vegas, NV, [online] [Retrieved Jun. 26, 2007], Retrieved from the Internet <URL: https://www.blackhat.com/presentations/bh-usa-02/bh-us-02-aitel-spike.ppt>.
Beddoe, M., "Heuristics for Packet Field Identification," Mu Security Research Labs blog, Jan. 4, 2007, [online] [Retrieved Jun. 26, 2007], Retrieved from the Internet <URL: http://labs.musecurity.com/2007/01/04/heuristics-for-packet-field-identification/>.
Beddoe, M., "Network Protocol Analysis using Bioinformatics Algorithms," 2004, [Retrieved on May 17, 2007] Retrieved from the Internet <URL:http://www.4tphi.net/~awalters/PI/pi.pdf>.
Beddoe, M., "The Protocol Informatics Project: Automating Network Protocol Analysis" (presentation slides), 2005.
Beizer, B., "Chapter 9: Syntax Testing," in Software Testing Techniques, 2nd Ed., 1990, pp. 284-319, Van Nostrand Reinhold, New York, NY.
Beizer, B., "Chapter 8: Syntax Testing," in Black-Box Testing: Techniques for Functional Testing of Software and Systems, 1995, pp. 177-201, John Wiley & Sons, Inc., New York, NY.
Case, J. et al., "A Simple Network Management Protocol (SNMP)" (RFC 1157), May 1990, [Retrieved on May 17, 2007] Retrieved from the Internet <URL:http://www.faqs.org/rfcs/rfc1157.html>.
Finlay, I. et al., "Multiple Vulnerabilities in Many Implementations of the Simple Network Management Protocol (SNMP)," Cert® Advisory CA-2002-03, Pittsburgh, PA, US.
Griffin, J.L., "Testing Protocol Implementation Robustness," Published in the Proceedings of 29$^{th}$ Annual International Symposium on Fault-Tolerant Computing (FTC), Jun. 15-18, 1999, Madison, Wisconsin, US.
Kaksonen, R., "A Functional Method for Assessing Protocol Implementation Security," VTT Publications 448, 2001, 128 p.+ app. 15p., Technical Research Centre of Finland, FI.
Kaksonen, R., "Software Security Assessment through Specification Mutations and Fault Injection," (presentation slides), Presented at the Int'l Federation for Information Processing (IFIP) TC-6/TC-11 Fifth Joint Int'l Working Conference on Communications and Multimedia Security (CMS'01), May 21-22, 2001, Darmstadt, Germany.
Kaksonen, R. et al., "Software Security Assessment through Specification Mutations and Fault Injection," Proceedings of the Int'l Federation for Information Processing (IFIP) TC-6/TC-11 Fifth Joint Int'l Working Conference on Communications and Multimedia Security (CMS'01), May 21-22, 2001, Darmstadt, Germany, pp. 173-183.
Kaksonen, R. et al., "Vulnerability Analysis of Software through Syntax Testing," 2000, [online] [Retrieved on Sep. 1, 2006] Retrieved from the Internet <URL:http://www.ee.oulu.fi/research/ouspg/protos/analysis/WP2000-robustness/>.
Marquis, S. et al., "SCL: A Language for Security Testing of Network Applications," Proceedings: 15th IBM Centre for Advanced Studies Conference (CASCON), Toronto, Canada, Oct. 18-20, 2005, pp. 155-164, [Retrieved on May 17, 2007] Retrieved from the Internet [URL: http://post.queensu.ca/~trd/research/papers/marquisSCL.pdf].
McCloghrie, K. et al., "Structure of Management Information Version 2 (SMIv2)" (RFC 2578), Apr. 1999, [Retrieved on May 17, 2007] Retrieved from the Internet <URL: http://www.faqs.org/rfcs/rfc2578.html>.
Miller, B. et al., "Fuzz Revisited: A Re-examination of the Reliability of Unix Utilities and Services," Computer Sciences Department, Oct. 1995, pp. 1-23, Madison, Wisconsin, US.
Mu Security, "6 Degrees of Protocols," 2006.
Mu Security, "Protocol Vulnerability Patterns," Apr. 2006.
Nevill-Manning, C. et al., "Identifying Hierarchical Structure in Sequences: A linear-time algorithm," Journal of Artificial Intelligence Research, vol. 7, Sep. 1997, pp. 67-82, [Retrieved on May 17, 2007] Retrieved from the Internet <URL: http://arxiv.org/abs/cs/9709102>.
PCT International Search Report and Written Opinion, PCT/US06/09512, Aug. 31, 2006, 7 pages.
Protos Test-Suite: c06-snmpv1, University of Oulu (ee.oulu.fi)—http://www.ee.oulu.fi/research/ouspg/protos/testing/c06/snmpv1/index, Oct. 17, 2002, pp. 1-26, Finland.
Protos Test-Suite: c06-ldapv3, University of Oulu (ee.oulu.fi)—http://www.ee.oulu.fi/research/ouspg/protos/testing/c06/ldapv3/index.html, Dec. 2001, pp. 1-13, Finland.
Rubin, S. et al., "On the Completeness of Attack Mutation Algorithms," *19th IEEE Computer Security Foundations Workshop* (CSFW), Jul. 2006, 14 pages, [Online] [Retrieved on Jan. 19, 2010] Retrieved from the Internet<URL:http://pages.cs.wisc.edu/~jha/jha-papers/security/CSFW_2006.pdf>.
Sonne, B., "Covert Channel detection using Bioinformatics Algorithms," nCircle 360 Security blog, May 11, 2006, [online] [Retrieved on Jun. 26, 2007] Retrieved from the Internet <URL: http://blog.ncircle.com/archives/2006/05/covert_channel_detection_using.html>.
Tal, O. et al., "Syntax-based Vulnerability Testing of Frame-based Network Protocols," Proceedings: 2nd Annual Conference on Privacy, Security and Trust 2004, Fredericton, Canada, Oct. 13-15, 2004, pp. 155-160, [Retrieved on May 17, 2007] Retrieved from the Internet <URL:http://post.queensu.ca/~trd/research/papers/FinalPST04.pdf>.
Turcotte, Y. et al., "Security Vulnerabilities Assessment of the X.509 Protocol by Syntax-based Testing," Military Communications Conference (MILCOM), Monterey, CA, Oct. 31-Nov. 3, 2004, vol. 3, pp. 1572-1578, [Retrieved on May 17, 2007] Retrieved from the Internet <URL:http://post.queensu.ca/~trd/research/papers/MILCOM.pdf>.
Turcotte, Y., "Syntax Testing of Communication Protocols for Security Vulnerabilities (Testing of a subset of the Entrust PKI)," Nov. 2003, [online] [Retrieved on Sep. 1, 2006] Retrieved from the Internet <URL:http://tarpit.rmc.ca/paul/EEE491A%20Fall%202003/Slides/EE491%20GL3%20Syntax%20Testing.ppt>.
Turcotte, Y., "Abstract: Syntax Testing of the Entrust Public Key Infrastructure for Security Vulnerabilities in the X.509 Certificate," 2003, [online] [Retrieved on Sep. 1, 2006] Retrieved from the Internet <URL:http://www.rmc.ca/academic/gradrech/abstracts/2003/ece2003-3_e.html>.
U.S. Appl. No. 60/662,430, filed Mar. 15, 2005.
U.S. Appl. No. 11/351,402, filed Feb. 10, 2006.
U.S. Appl. No. 11/351,409, filed Feb. 10, 2006.
U.S. Appl. No. 11/514,809, filed Sep. 1, 2006.
U.S. Appl. No. 11/696,605, filed Apr. 4, 2007.
U.S. Appl. No. 11/760,600, filed Jun. 8, 2007.
U.S. Appl. No. 11/850,164, filed Sep. 5, 2007.
U.S. Appl. No. 11/859,691, filed Sep. 21, 2007.
U.S. Appl. No. 12/234,450, filed Sep. 19, 2008.
U.S. Appl. No. 12/260,438, filed Oct. 29, 2008.
Xiao, S. et al., "Integrated TCP/IP Protocol Software Testing for Vulnerability Detection," Proceedings of International Conference on Computer Networks and Mobile Computing (ICCNMC'03), Oct. 20-23, 2003, Shanghai, China, pp. 311-319.
Zhang, S. et al., "A Lightweight Approach to State Based Security Testing," Proceedings: 16th IBM Centre for Advanced Studies Conference (CASCON), Toronto, Canada, Oct. 2006, Article No. 28, [Retrieved on May 17, 2007] Retrieved from the Internet <URL: http://post.queensu.ca/~trd/research/papers/zhangState.pdf>.
Zhang, S. et al., "Applying Software Transformation Techniques to Security Testing," Proceedings: Software Technology and Engineering in Practice (STEP), Toronto, Canada, Oct. 2005, [Retrieved on May 17, 2007] Retrieved from the Internet <URL: http://post.queensu.ca/~trd/research/papers/step2005.pdf>.

* cited by examiner

SYNTAX-BASED SECURITY ANALYSIS USING DYNAMICALLY GENERATED TEST CASES

REFERENCE TO RELATED APPLICATIONS

This application is related to the following utility applications, which are hereby incorporated by reference in their entirety: U.S. application Ser. No. 11/351,403, filed on Feb. 10, 2006, entitled "Platform for Analyzing the Security of Communication Protocols and Channels"; U.S. application Ser. No. 11/514,809, filed on Sep. 1, 2006, entitled "Automated Generation of Attacks for Analyzing the Security of Communication Protocols and Channels"; and U.S. application Ser. No. 11/745,338, filed on May 7, 2007, entitled "Modification of Messages for Analyzing the Security of Communication Protocols and Channels."

BACKGROUND

The present invention relates to security analysis and/or syntax testing of hardware and software and automated generation and execution of test cases.

Computerized communication, whether it occurs at the application level or at the network level, generally involves the exchange of data or messages in a known, structured format (a "protocol"). Specifically, a protocol refers to what is being communicated (for example, the data or message content). Types of protocols include, for example, networking protocols (including network packets), application program interfaces (APIs; including API calls, remote method invocation (RMI), and remote procedure call (RPC)), and file formats.

Software applications and hardware devices that rely on these formats can be vulnerable to various attacks that are generally known as "protocol abuse." Protocol abuse consists of sending messages that are invalid or malformed with respect to a particular protocol ("protocol anomalies") or sending messages that are well-formed but inappropriate based on a system's state. Messages whose purpose is to attack a system are commonly known as malicious network traffic.

Various systems have been developed that identify or detect attacks when they occur. This functionality, which is known as intrusion detection, can be implemented by a system that is either passive or active. A passive intrusion detection system (IDS) will merely detect an attack, while an active IDS will attempt to thwart the attack. Note that an IDS reacts to an actual attack. While an IDS might be able to detect an attack, it does not change the fact that an attack has occurred and might have damaged the underlying system.

A proactive solution to the attack problem is to analyze a system ahead of time to discover or identify any vulnerabilities. This way, the vulnerabilities can be addressed before the system is deployed or released to customers. This process, which is known as "security analysis," can be performed using various methodologies. One methodology for analyzing the security of a device-under-analysis (DUA) is to treat the DUA as a black box. Under this methodology, the DUA is analyzed via the interfaces that it presents to the outside world. As a result, it is not necessary to access the source code or object code comprising the DUA.

For example, a security analyzer executes a test case by sending one or more messages (test messages) to the DUA. The analyzer then observes the DUA's response. A response can include, for example, registering an error or generating a message (response message). The DUA can then send the response message to the analyzer. Depending on the analysis test case being performed, the analyzer might send another test message to the DUA upon receiving the response message from the DUA. The test messages and response messages can be analyzed to determine whether the DUA operated correctly.

In one embodiment, a test message is "improper" in that its structure does not conform to the appropriate protocol. Protocol structure (also known as syntax) refers to the layout of a message, such as its fields, arguments, or parameters, and its possible length. In this embodiment, security analysis of the DUA would be similar to syntax-based vulnerability testing of the DUA's implementation of the protocol.

Each test case that is executed helps to analyze a different aspect of the DUA's security. Thus, in order to analyze the security of a DUA, it is necessary to execute several different test cases. While test cases can be created manually, it is more efficient to create them in an automated fashion (see, for example, U.S. application Ser. No. 11/514,809, filed on Sep. 1, 2006, entitled "Automated Generation of Attacks for Analyzing the Security of Communication Protocols and Channels" and U.S. application Ser. No. 11/745,338, filed on May 7, 2007, entitled "Modification of Messages for Analyzing the Security of Communication Protocols and Channels").

In the past, a complete test case was created before the test case was used for testing. For example, consider a test case that calls for an exchange of messages: a first message (test message) sent to the DUA, a second message (response message) received from the DUA, and a third message (test message) sent to the DUA. In the past, the test case would define the first and third messages and cause them to be sent at the appropriate times. Since the third message was defined when the test case was created, it remained the same every time the test case was executed, regardless of the contents of the second message.

But what if the protocol called for the contents of the third message to depend on the contents of the second message? In this situation, the test case would have to parse the second message and then use this information to generate the third message. This would be difficult to achieve due to the dynamic nature of protocols, the ambiguity of protocol specifications, and the diversity of protocol implementations. As a result, static test cases can be insufficient to effectively perform syntax-based testing.

SUMMARY

Static test cases can be insufficient to effectively perform syntax-based testing. With a dynamic security analyzer, the generation of a test case is intertwined with the execution of that test case, and the generation can depend on the execution. Specifically, when a dynamic security analyzer begins executing a test case, the test case may or may not have been fully generated. This way, later messages in the test case message exchange can be generated based on earlier messages in the exchange. This enables the test case to take into account the dynamic nature of network protocols.

A security analysis methodology is used to analyze the security of a device-under-analysis (DUA) with respect to a particular protocol message exchange. First, the mutation points that exist in the message exchange are determined. Then, the message exchange is executed multiple times— once for each mutation point. Each execution applies the mutation associated with that particular mutation point (e.g., a particular message during the exchange is modified in a particular way) to create a mutated message exchange. In other words, each message exchange with an applied mutation point corresponds to a test case.

In one embodiment, the first step of the methodology is achieved as follows: The complete message exchange is performed using proper (i.e., not mutated) messages. For example, a security analyzer exchanges messages with a DUA according to a particular protocol. During the performance of the exchange, the messages that are sent back and forth are observed, along with the fields that they contain. Each message is stored, including the values of its fields. Also, the mutation points of each message are stored. As mentioned above, some mutations target a message as a whole, while others target a field of a message. For a mutation that targets an entire message, it is sufficient to store an indication of the mutation. For a mutation that targets a field, an indication of the field is stored along with an indication of the mutation.

In one embodiment, the second step of the methodology is achieved as follows: During the performance of an exchange, the messages that are generated by the security analyzer are observed, along with the fields that they contain, before they are sent to the DUA. When a message or a field is observed that is due to be mutated (based on the particular mutation point currently being tested), that message or field is mutated before the message is sent to the DUA.

Other aspects of the invention include software, systems, components, and methods corresponding to the above, and applications of the above for purposes other than security analysis.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

In the following description, "device," "device-under-analysis," and "DUA" represent software and/or hardware. Software includes, for example, applications, operating systems, and/or communications systems. Hardware includes, for example, one or more devices. A device can be, for example, a switch, bridge, router (including wireline or wireless), packet filter, firewall (including stateful or deep inspection), Virtual Private Network (VPN) concentrator, Network Address Translation (NAT)-enabled device, proxy (including asymmetric), intrusion detection/prevention system, or network protocol analyzer. A DUA can also be multiple devices that are communicatively coupled to form a system or network of devices. For example, a DUA can be two firewall devices that establish an encrypted tunnel between themselves.

A platform for analyzing the security of a DUA, called a "security analyzer," is described in U.S. application Ser. No. 11/351,403, filed on Feb. 10, 2006, entitled "Platform for Analyzing the Security of Communication Protocols and Channels" ("Previous Application"), which is hereby incorporated by reference in its entirety. In one embodiment, the security analyzer in the Previous Application (hereinafter referred to as a "static security analyzer") is an appliance that is capable of executing attacks (test cases) to analyze the security of the DUA. A static security analyzer executes a test case by sending one or more messages (test messages) to the DUA. In one embodiment, a message is a network packet or a protocol data unit (PDU). The static analyzer then observes the DUA's response. A response can include, for example, registering an error or generating a message (response message). The DUA can then send the response message to the static analyzer. Depending on the analysis test case being performed, the static analyzer might send another test message to the DUA upon receiving the response message from the DUA. The test messages and response messages can be analyzed to determine whether the DUA operated correctly.

Consider a sequence of messages that are exchanged between a first device and a second device. The messages that are exchanged are supposed to adhere to a particular protocol. Each message in the exchange could be mutated (modified) in various ways so that its structure and/or content does not conform to the appropriate protocol. The way in which the mutated message differs from a proper message is referred to as a "mutation." Each mutation can be thought of as a function or algorithm that is applied to a valid protocol message in order to generate an invalid protocol message.

Many categories of mutations exist. One category targets a message as a whole. For example, an extra field can be added to the message (e.g., by appending a random number or string) or a field can be removed from the message. Another category targets a field of the message. Mutations in the second category are usually specialized based on the data type of the value of that field. For example, if a field is supposed to indicate an Internet Protocol (IP) address, it can be attacked by setting its value to 0.0.0.0.

Appendix A contains exemplary data types, each of which can be associated with one or more mutations. Appendix B contains exemplary semantic rules, each of which specifies how to (correctly) generate a semantic element of a message (e.g., a value of a field) and can be susceptible to attack. Appendix C contains exemplary input/output (I/O) rules, each of which specifies a lower-layer protocol underlying a message (e.g., a transport-layer protocol) and can be susceptible to attack. Appendix D contains exemplary mutations.

Each point in a message exchange where a message can be mutated in a particular way is called a "mutation point." Since a single message can be mutated in many different ways and a message exchange consists of many different messages (and, thus, many different mutation points), the total number of test cases (i.e., possible message exchanges that use mutated messages) grows exponentially. Yet, each of these test cases should be generated and executed in order to analyze the security of a DUA. When the dynamic nature of the DUA is taken into account (e.g., the types and numbers of messages that it can generate), the number of test cases becomes infinite.

In one embodiment, a new type of security analyzer (hereinafter referred to as a "dynamic security analyzer") is used that can generate a test case dynamically so that the test case does not need to be scripted prior to its execution. Recall that when a static security analyzer begins executing a test case (e.g., in order to perform syntax-based security analysis), the test case has already been fully scripted. Thus, the generation of a test case and the execution of that test case are completely independent of each other. Specifically, the way in which a test case is generated (e.g., manually or in an automated fashion and, if automated, how the automation works) is irrelevant to how the test case is executed and vice versa.

As described above, static test cases can be insufficient to effectively perform syntax-based testing. With a dynamic security analyzer, the generation of a test case is intertwined with the execution of that test case, and the generation can depend on the execution. Specifically, when a dynamic security analyzer begins executing a test case, the test case may or may not have been fully generated. This way, later messages in the test case message exchange can be generated based on earlier messages in the exchange. This enables the test case to take into account the dynamic nature of network protocols.

For example, consider a test case that calls for an exchange of messages: a first message (test message) sent to the DUA, a second message (response message) received from the DUA, and a third message (test message) sent to the DUA wherein the protocol calls for the contents of the third message to depend on the contents of the second message. When a dynamic security analyzer begins executing this test case, the third message has not yet been generated. Instead, the third message will be generated after the second message has been received (i.e., during execution of the test case).

I. Security Analysis Methodology

Figure 1:
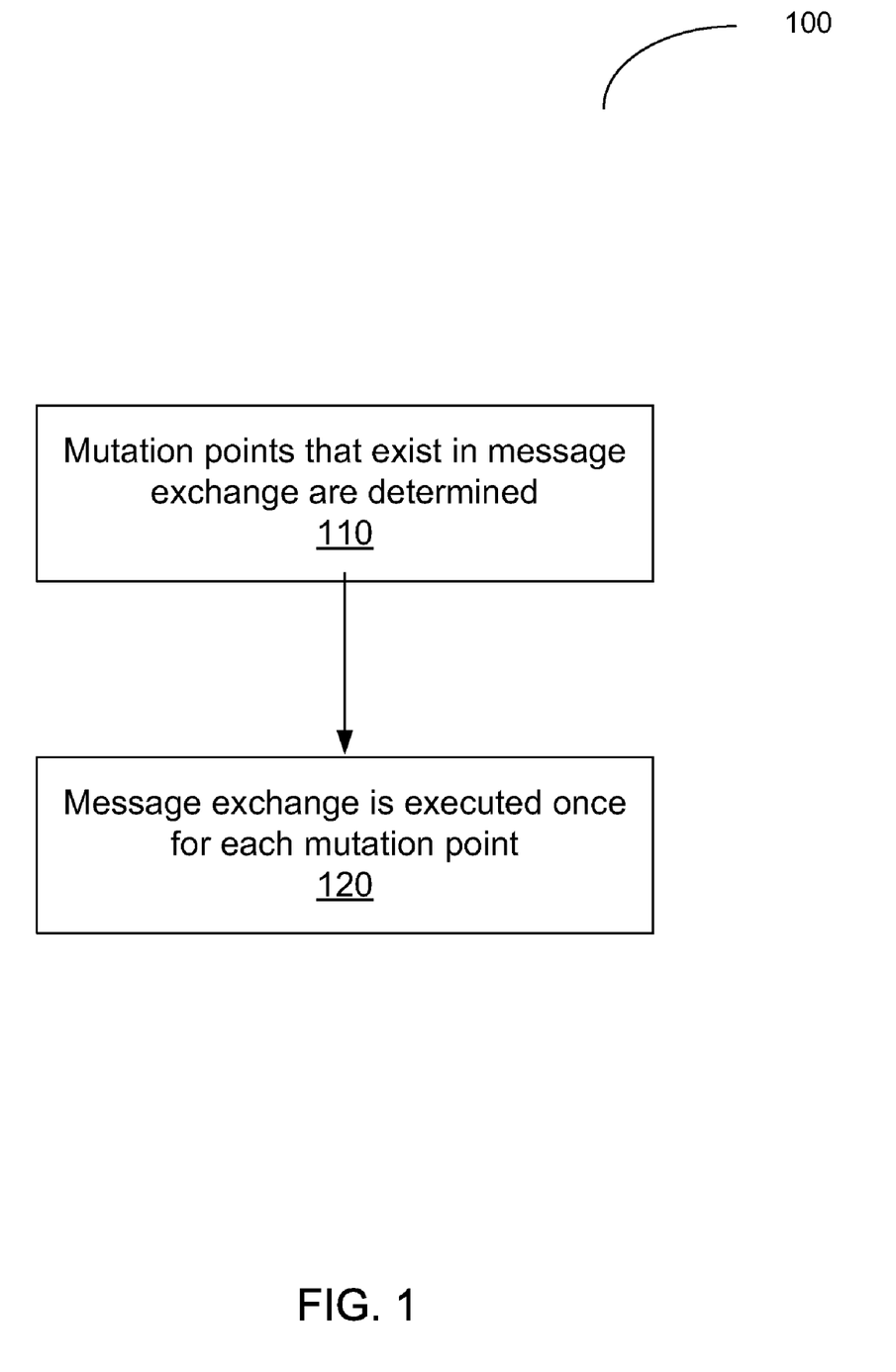
FIG. 1 illustrates a flowchart for a security analysis methodology, according to one embodiment of the invention.

FIG. 1 illustrates a flowchart for a security analysis methodology, according to one embodiment of the invention. The security analysis methodology 100 is used to analyze a DUA's security with respect to a particular protocol message exchange. First, the mutation points that exist in the message exchange are determined 110. Then, the message exchange is executed 120 multiple times—once for each mutation point. Each execution applies the mutation associated with that particular mutation point (e.g., a particular message during the exchange is modified in a particular way) to create a mutated message exchange. In other words, each message exchange with an applied mutation point corresponds to a test case.

I.A Determination of Mutation Points

The first step in security analysis methodology 100 is to determine 110 the mutation points that exist in a particular message exchange. In one embodiment, this is achieved as follows: The complete message exchange is performed using proper (i.e., not mutated) messages. For example, a security analyzer exchanges messages with a DUA according to a particular protocol.

During the performance of the exchange, the messages that are sent back and forth are observed, along with the fields that they contain. Each message is stored, including the values of its fields. Also, the mutation points of each message are stored. As mentioned above, some mutations target a message as a whole, while others target a field of a message. For a mutation that targets an entire message, it is sufficient to store an indication of the mutation. For a mutation that targets a field, an indication of the field is stored along with an indication of the mutation.

For example, if a message includes an IP address field, an indication is stored that this field can be mutated using IP address attacks (such as setting the address to 0.0.0.0, as mentioned above). As another example, if a message includes a length field, an indication is stored that this field can be mutated using length-related attacks (such as setting the length to a negative number).

Since the message exchange is occurring with the actual DUA that will be analyzed, the list of mutation points will be tailored specifically to that DUA and the testing environment. This phase is referred to as "enumeration" because the various mutation points are enumerated.

I.B Execution of Mutated Message Exchange

The second step in security analysis methodology 100 is to execute 120, for each mutation point that was enumerated in the previous step, a mutated message exchange. This will ensure that all of the mutation points are tested. This phase is referred to as the analysis phase, since the DUA is being analyzed.

During the performance of an exchange, the messages that are generated by the security analyzer are observed, along with the fields that they contain, before they are sent to the DUA. When a message or a field is observed that is due to be mutated (based on the particular mutation point currently being tested), that message or field is mutated before the message is sent to the DUA.

Since the DUA is deterministic, a message exchange should proceed in exactly the same way that it did during the enumeration phase. Thus, the list of mutation points that was generated during the enumeration phase should also apply to later message exchanges during the analysis phase. Also, mutations can be based on messages that were stored during the enumeration phase. This means that messages can be customized specifically to this DUA and its responses.

Since the original (non-mutated) message exchange was stored, the security analyzer can compare a) a message that was generated by the DUA during the analysis phase (possibly in response to receiving a mutated message) and b) the corresponding message that was generated by the DUA during the enumeration phase.

Note that the enumeration phase and the analysis phase are similar. In each phase, a security analyzer creates a message to be sent to the DUA. This message is then processed. In the enumeration phase, the message is processed by storing the message and its mutation points. In the analysis phase, the message is processed by mutating it according to a particular mutation. In both phases, the message is then serialized and sent to the DUA.

Also, in both the enumeration phase and the analysis phase, when a message is received from the DUA, the message is made available to be used to generate a message if desired (e.g., if the content of the next message sent to the DUA is supposed to be based on the content of the message that was received from the DUA).

II. Exemplary Implementation

When a protocol message exchange occurs between two devices (e.g., a security analyzer and a DUA), each protocol message is a byte stream. In one embodiment, a protocol message is also represented by a data structure (called a "message object") that is constructed out of various building blocks (referred to as "elements") such as structs (structures), lists, and primitives. A primitive is the most basic element and is used for integers and byte strings. A list can contain an ordered, variable number of elements (structs, primitives, and lists). A struct is a fixed-length collection of lists and/or primitives. For example, a message is represented by a message object (named "a") that is a struct that contains two elements—a primitive (named "b") and a list (named "c"):

a=Struct<<[
b=Primitive
c=List
]

In one embodiment, an element within a message object represents a field of a message. For example, element b (a primitive) within message object a (a struct) can represent a length of a message.

Also stored within a message object are one or more "mutation contexts." A mutation context includes a) an identifier of a mutation, b) a function, and c) one or more identifiers of elements within the message object. The identifier of the mutation uniquely identifies the mutation within the object. The function provides a way to mutate the object (and, therefore, the message that it represents) according to the mutation. An identifier of an element represents a field of the message that is mutated by the function.

In one embodiment, each message object supports five methods: construct, input, output, variants, and mutate. The construct method instantiates or sets up an object using any declared members and default values. The input method, which takes as input a message (e.g., a byte stream), parses the message and modifies the object to reflect the message (e.g., to reflect the values stored in the message's fields). In this way, the input method overrides the default values (which were set based on the construct method) with information obtained from a byte stream.

The output method serializes the object (e.g., into a byte stream) so that the object's data can be sent to a network or written to a file. In one embodiment, the output method operates in a cascading or recursive way. For example, consider a message object (named "a") that is a struct that contains a primitive (named "b") and a list (named "c"):
a=Struct<<[
b=Primitive
c=List
]
In order to generate a byte stream that represents the message object "a", a's output method is called. This, in turn, calls b's output method and c's output method. Note that element b and element c each support their own output methods. In one embodiment, the output method for an element is a function that specifies how to serialize that element. This element serialization can then be used to construct the serialization of the overall message object.

The variants method returns one or more "variants" and can be used to query a message object. A variant indicates a target field (as represented by an element of a message object) and a mutation to apply to that field. In one embodiment, a variant is indicated using a dotted path notation. For example, using the message object "a" described above, the variant named "a.b.mutation1" would refer to a mutation named "mutation1" that applies to the field "b" of message "a" (as represented by the element "b" within the message object "a"). In one embodiment, a variant corresponds to a mutation point.

In one embodiment, the variants method returns one or more strings (e.g., an array of one or more strings), where each string represents a variant using the dotted path notation explained above. The variants method can be implemented by, for example: Iterating through the mutation contexts of the object. For each mutation context, iterating through the identifiers of the elements within the message object. For each identifier of an element, generating a string that contains the identifier of the element followed by a period (".") followed by the identifier of the mutation.

The mutate method, which takes as input a variant, mutates a message object according to the variant. For example, calling the mutate method on the message object "a" described above using the variant "a.b.mutate1" as input would mutate the message "a" such that when a's output method is called, the resulting serialization will reflect the fact that the field "b" has been mutated according to the "mutation1" mutation. Similarly, if the message as a whole has a mutation associated with it called "mutation2" then executing the mutation a.mutation2 would mutate the message "a" such that when a's output method is called, the resulting serialization will reflect the fact that "a" has been mutated as a whole according to the "mutation2" mutation.

In one embodiment, the mutate method modifies the implementation of the output method of an element. This way, when the output method is called on the element, the element serialization that is generated will reflect the element after it has been mutated by the mutation identified within the variant. The mutate method can be implemented by, for example: Parsing the variant (which was provided as input) into an identifier of an element (e.g., "a.b") and an identifier of a mutation (e.g., "mutation1"). Identifying the element within the message object that corresponds to the element identifier (e.g., "a.b"). Identifying the mutation context within the message object that corresponds to the mutation identifier (e.g., "mutation1"). Replacing the implementation of the output method of that element with the function of the mutation context.

In this way, mutation is an alternate form of serialization. An element's default output method creates a proper (i.e., non-mutated) serialization. If the element is meant to be mutated, the default output method is overridden with a custom method (namely, the function within the mutation context). This way, when the output method is called on that element, the result will be a mutated serialization.

Thus, there is a separation between authoring a protocol message object and authoring a mutation for that object. Because of this, a mutation can be transparently applied to a protocol message object.

II.A Enumeration

Recall that in the enumeration phase, a complete message exchange is performed using proper (i.e., not mutated) messages. In this phase, some message are generated and sent to the DUA, while other messages are received from the DUA.

Figure 2:
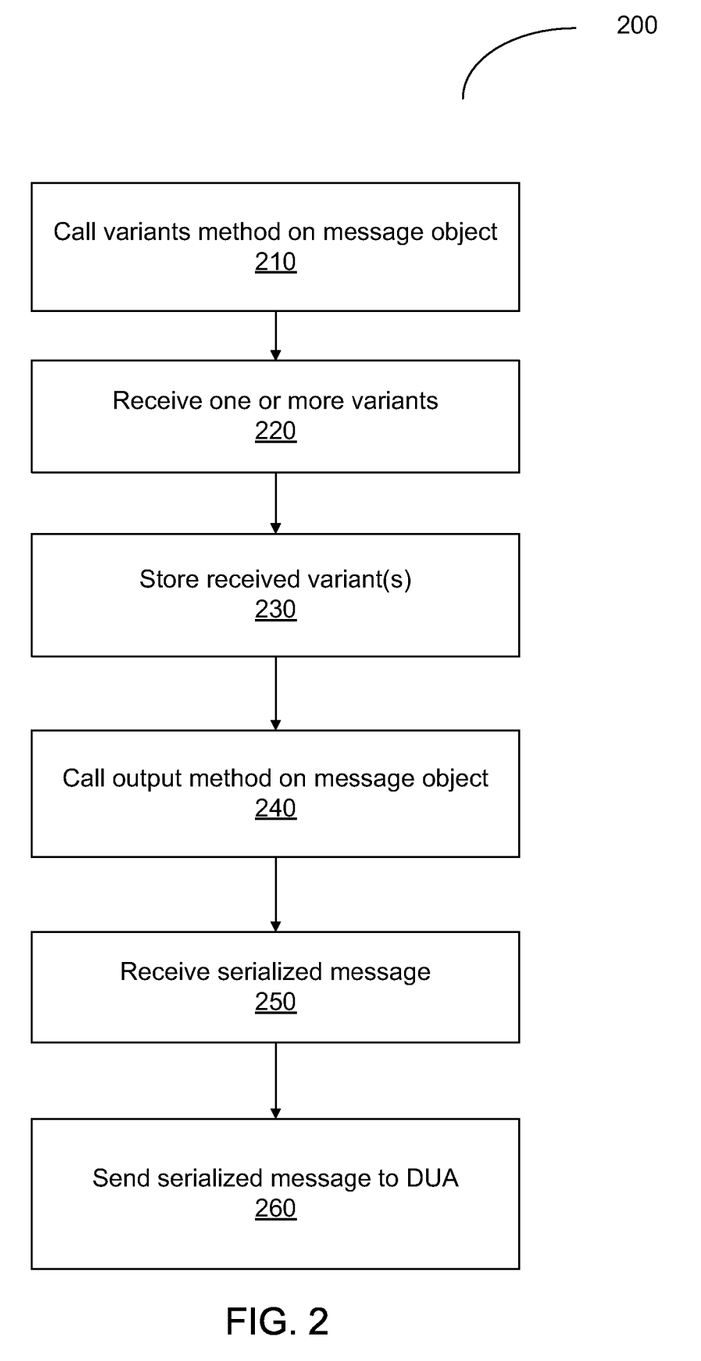
FIG. 2 illustrates a flowchart for a portion of the enumeration phase that concerns sending a message to the DUA, according to one embodiment of the invention.

FIG. 2 illustrates a flowchart for a portion of the enumeration phase that concerns sending a message to the DUA, according to one embodiment of the invention. Before the method 200 of FIG. 2 begins, a non-mutated message object is generated to be sent to the DUA.

Method 200 begins: The variants method is called 210 on the message object, which queries the object and returns one or more variants. The one or more variants are received 220. The one or more variants are stored 230. In one embodiment, the variants are stored in a list (called a "variant list") such that the most recently identified variant is appended to the end of the list. The output method is called 240 on the message object, which returns a serialized version (e.g., a byte stream) of the message that is represented by the object. The serialized message is received 250. The serialized message is sent 260 to the DUA.

In one embodiment, the method 200 is performed once for every non-mutated message object that is generated to be sent to the DUA.

A message can also be received from the DUA. In one embodiment, when a message (in serialized form) is received from the DUA, a message object is created that represents the received message. The message object is available to be used to generate a message if desired (e.g., if the content of the next message sent to the DUA is supposed to be based on the content of the message that was received from the DUA).

In one embodiment, the steps of the previous paragraph are performed once for every message object that is received from the DUA.

II.B Analysis

Recall that in the analysis phase, the message exchange of the enumeration phase is performed once for each variant (mutation point) that was identified during the enumeration phase. This means that once one message in an exchange has been mutated according to a variant, none of the remaining messages in the exchange will be mutated. In this phase, some message are generated and sent to the DUA, while other messages are received from the DUA.

Figure 3:
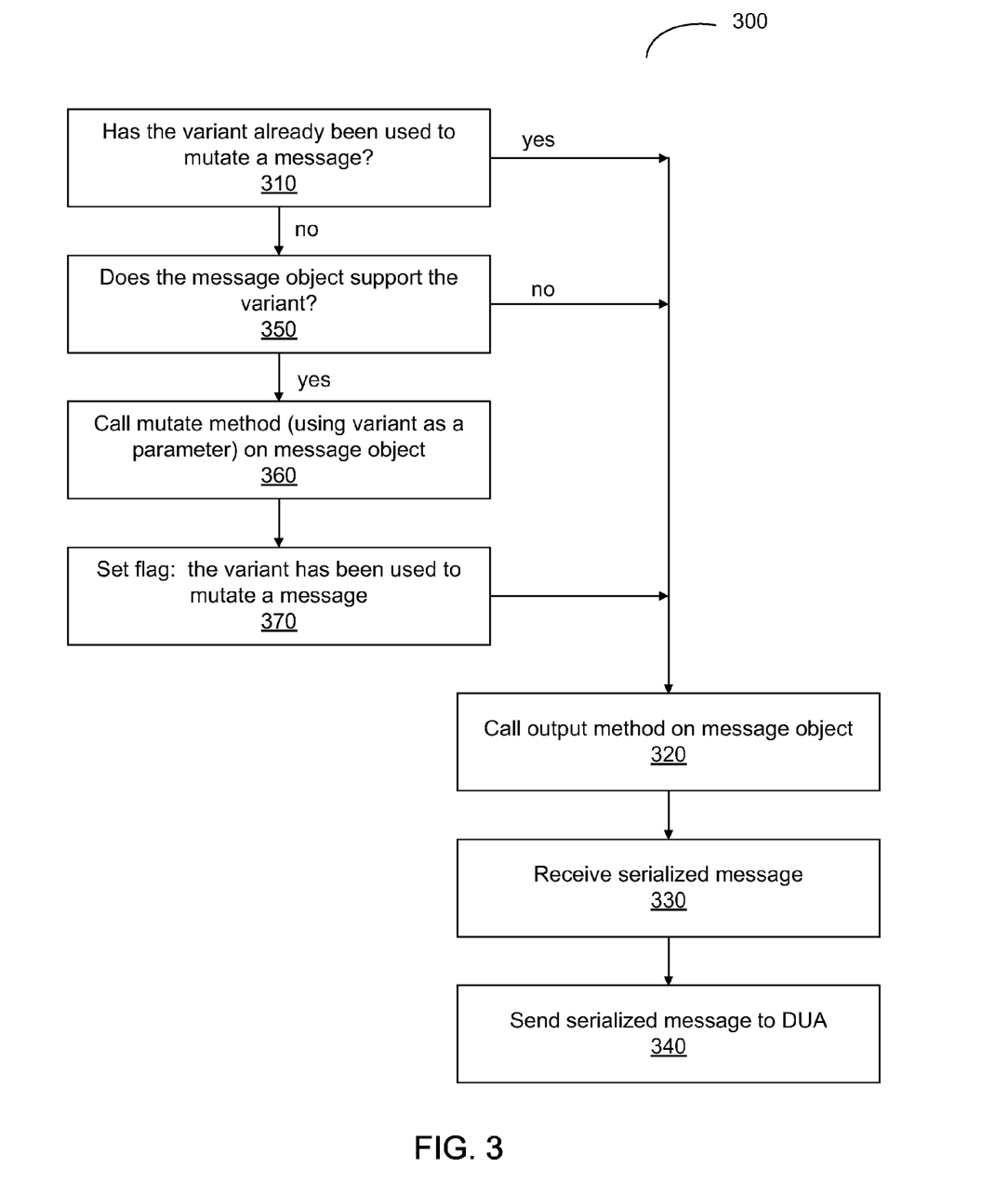
FIG. 3 illustrates a flowchart for a portion of the analysis phase that concerns sending a message to the DUA, according to one embodiment of the invention.

FIG. 3 illustrates a flowchart for a portion of the analysis phase that concerns sending a message to the DUA, according to one embodiment of the invention. Before the method 300 of FIG. 3 begins, three actions are performed. These actions can be performed in any order, either sequentially or simultaneously. One, a non-mutated message object is generated to be sent to the DUA. Two, a variant is identified. This variant is the variant that will be tested by the message exchange. For example, the identified variant is a variant that was stored during the enumeration phase (e.g., during step 230 of FIG. 2). In one embodiment, the variants are iterated through (one variant for each performance of the message exchange) in order starting with the variant that was identified first during the enumeration phase and ending with the variant that was identified last during the enumeration phase. Three, a flag is set to indicate that the variant has not yet been used to mutate a message. Recall that once one message in an exchange has been mutated according to a variant, none of the remaining messages in the exchange will be mutated. Thus, once one message has been mutated, the remaining messages can automatically be serialized and sent to the DUA.

Method 300 begins: A determination is made 310 regarding whether the variant has already been used to mutate a message. If the variant has already been used, the output method is called 320 on the message object, which returns a serialized version (e.g., a byte stream) of the message that is represented by the object. The serialized message is received 330. The serialized message is sent 340 to the DUA.

If the variant has not yet been used, a determination is made 350 regarding whether the message object supports the variant. If the message object does not support the variant, steps 320, 330, and 340 are performed, as described above.

If the message object does support the variant, the mutate method is called on the message object using the variant as a parameter, which mutates the message object. The flag is set to indicate that the variant has been used to mutate a message. The output method is then called 320 on the mutated message object, which returns a serialized version (e.g., a byte stream) of the message that is represented by the object. Steps 330 and 340 are performed as described above.

In one embodiment, the method 300 is performed once for every non-mutated message object that is generated to be sent to the DUA. After the complete exchange has been performed, the exchange can be performed again (e.g., using a different variant).

A message can also be received from the DUA. In one embodiment, when a message (in serialized form) is received from the DUA, a message object is created that represents the received message. The message object is available to be used to generate a message if desired (e.g., if the content of the next message sent to the DUA is supposed to be based on the content of the message that was received from the DUA).

In one embodiment, the steps of the previous paragraph are performed once for every message object that is received from the DUA.

III. Additional Embodiments

When creating a network protocol message, the order of operations is not always as simple as top-down or bottom-up evaluation. There are many situations where length values should be computed before checksum values regardless of where these values are located in the data structure. The traditional way to solve this problem would be to attach logic to the top most element in the data structure and then perform the required computations in the correct order. The problem with this approach is that it breaks encapsulation. Network protocols have many layers, and many steps should be performed at each layer to craft a correct protocol message. For example, assume that a protocol has three layers. Layer 3 should perform a length computation on Layers 1 through 3, and Layer 2 should perform a checksum computation on Layers 1 through 3. If this data structure were to be evaluated top down, Layer 2 would perform the checksum and then Layer 3 would perform the length computation. This would result in an incorrectly generated packet. The correct logic would be for the checksum to be computed after the length value is computed.

In one embodiment, the computation and/or evaluation of semantic relationships like the one described above is deferred. For example, the order of operations can be defined as needed while preserving logic encapsulation. When objects are being serialized, a method can be invoked (called "after") which takes as an argument an object and a block of code. This block of code is added to a cache. When the object is evaluated, the block is then evaluated. This way, operations can be performed in any order desired while still encapsulating all the logic at the appropriate layer.

A security analyzer can be implemented in hardware, software, or a combination of both. Also, a message can be any type of structured data, such as a file. If the message is a file, the DUA would be the software application or device that opens and/or executes the file.

In the preceding description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages may be used to implement the teachings of the invention as described herein.

APPENDIX A

Data types include, for example:
ASCII (American Standard Code for Information Interchange): ascii.crlf (carriage return/line feed), ascii.cstring (character string), ascii.dsv (delimiter separated values), ascii.ipv4 (Internet Protocol version 4), ascii.length, ascii.version ASN (Abstract Syntax Notation): asn.counter, asn.gauge, asn.id, asn.integer, asn.ip, asn.null, asn.oid, asn.sequence, asn.string.bit, asn.string.general, asn.string.ia5 (International Alphabet 5—ASCII), asn.string.octet, asn.string.printable, asn.string.utc (Coordinated Universal Time), asn.string.utf8 (8-bit Unicode Transformation Format), asn.tag, asn.timeticks Block
Checksum: checksum.adler32 (Adler-32 checksum algorithm), checksum.crc16 (cyclic redundancy check (CRC) function using 17-bit generator polynomial), checksum.crc32 (CRC function using 33-bit generator polynomial), checksum.ipv4 (checksum of header of IPv4 packet)

Data: data.align, data.random
Encode: encode.base64, encode.qprint (Quoted-Printable (QP) format)
File: file.path
HTTP (HyperText Transfer Protocol): http.header
List
Message
Net: net.ipv4 (IPv4 address), net.ipv6 (IPv6 address), net.mac (Media Access Control address)
SMTP (Simple Mail Transfer Protocol): smtp.domain, smtp.mailbox, smtp.path
String
Type: type.count16, type.count32, type.count8, type.id16, type.id32, type.id8, type.length16, type.length32, type.length8, type.offset16, type.offset32, type.offset8, type.uint16 (unsigned 16-bit integer, type.uint32 (unsigned 32-bit integer), type.uint8 (unsigned 8-bit integer)

XDR (eXternal Data Representation): xdr.array, xdr.integer, xdr.opaque, xdr.string

APPENDIX B

Types of semantic rules include, for example:
Data compression algorithms—compress.zlib
Cryptographic algorithms—crypto.digest.md2, crypto.digest.md4, crypto.digest.md5, crypto.digest.ripemd160, crypto.digest.sha, crypto.digest.sha1, crypto.otp
ASCII data algorithms—data.ascii.length, data.ascii.sequence
Abstract Syntax Notation (ASN) data algorithms—data.asn.enclosure, data.asn.explicit-tag, data.asn.integer, data.asn.length, data.asn.null, data.asn.oid, data.asn.string
Checksum data algorithms—data.checksum, data.checksum.adler32, data.checksum.ipv6
Cyclic Redundancy Check (CRC) data algorithms—data.crc
Other data algorithms—data.length, data.node.count, data.offset, data.overwrite, data.pad, data.pad.roundup, data.random, data.random.node, data.segment, data.sequence, data.stacker, data.substitute
String data algorithms—data.string.int, data.string.ip, data.string.ipv6, data.string.mac, data.string.mac.multicast, data.string.mac.multicast.ipv6
Encoding algorithms—encode.base64, encode.bits, encode.eui64, encode.nbname, encode.qprint, encode.url, encode.uuencode
File algorithms—file.reader
Input algorithms—input.slurper, input.slurper.ascii, input.slurper2
Logic algorithms—predicate.exists
Protocol algorithms—protto.http.md5auth, proto.ospf.auth, proto.radius.user-pass, proto.sctp.checksum, proto.tacacsp.body

APPENDIX C

Types of input/output (I/O) rules include, for example:
Console—io.console, io.console.pair
File—io.file.writer
Internet Protocol (IP)—io.net.ip, io.net.ip.base, io.net.ip.pair, io.net.ip6, io.net.ip6.pair
Raw network—io.net.raw, io.net.raw.pair
Secure Shell (SSH)—io.net.ssh
Secure Sockets Layer (SSL)—io.net.ssl, io.net.ssl.pair
Transmission Control Protocol (TCP)—io.net.tcp, io.net.tcp.pair, io.net.tcp6, io.net.tcp6.pair, io.net.tcp6d, io.net.tcpd
User Datagram Protocol (UDP)—io.net.udp, io.net.udp.base, io.net.udp.pair, io.net.udp6, io.net.udp6.pair, io.net.udpd
Null—io.null.pair
Packet capture (pcap)—io.pcap.writer, io.pcap.writer.ip, io.pcap.writer.ip6, io.pcap.writer.tcp, io.pcap.writer.tcp6, io.pcap.writer.udp, io.pcap.writer.udp6

APPENDIX D

Mutations include, for example:
Struct::Empty—removes a sub-structure (such as a field in a message, a data item or data structure in a compound data structure, or a node or sub-graph in a graph)

Struct::Append—adds data to a structure (such as a field, message, data item, data structure, node, or graph); length and type of data can vary Struct::Inject—injects one or more characters between child nodes; number and type of characters can vary Struct::Overwrite—overwrites one or more characters of a graph (or sub-graph) after the graph has been transformed; number and type of characters can vary Struct::Truncated—removes a node from a graph (or sub-graph)

Struct::Repeated—adds duplicates of one or more children of a node; number of duplicates and number of children can vary String::EmptyLines—prepends one or more empty lines to a structure; number of lines can vary String::Surround—adds one or more characters in order to surround one or more child nodes; number and type of characters can vary String::Random—generates one or more random characters; number of characters can vary String::Overflow—generates one or more characters; number and type of characters can vary String::Format—generates a format string; type of format placeholder can vary (e.g., character string (% s), integer as hexadecimal number (% x), integer as signed decimal number (% d))

What is claimed is:

1. A method for using a dynamic security analyzer to generate a dynamic attack on a device under analysis (DUA) by applying the attack to an exchange of a series of related messages with the DUA according to a communication protocol, comprising:
   determining with the security analyzer a set of one or more variants that exist in the exchange of related messages, wherein the exchange of related messages comprises at least first, second and third related messages according to the communication protocol, the first message being sent to the DUA, the second message being a response from the DUA to the first message, and the third message being sent to the DUA and depending, at least in part, on the content of the second message, and wherein each variant of the set of one or more variants describes a target message field and a mutation to apply to the target message field;
   identifying with the security analyzer the first message, wherein the first message is to be sent to the DUA;
   determining with the security analyzer whether the first message supports a first variant selected from the set of one or more variants;
   conditioned upon determining that the first message does not support the first variant, sending with the security analyzer the first message to the DUA;
   in response to the first message receiving with the security analyzer the second message from the DUA;
   after receiving the second message, identifying with the security analyzer the third message to the DUA that responds to the second message according to the communication protocol, the content of the third message depending, at least in part, on content of the second message;
   determining with the security analyzer whether the third message supports the first variant;
   conditioned upon determining that the first message did not support the first variant and that the third message does support the first variant, mutating the third message with the security analyzer according to the first variant to produce a third mutated message; and
   sending to the DUA the third mutated message with the security analyzer.

2. The method of claim 1, wherein the third message is represented by a message object.

3. The method of claim 2, wherein the message object stores a set of one or more variants that are supported by the third message.

4. The method of claim 3, wherein determining whether the third message supports the first variant comprises querying the message object.

5. The method of claim 1, wherein the first variant is represented by a string.

6. The method of claim 5, wherein the third message is represented by a message object.

7. The method of claim 6, wherein the message object supports an output method that returns a serialized version of the third message represented by the message object.

8. The method of claim 7, wherein mutating the third message according to the first variant comprises
   modifying an output method supported by the message object.

9. The method of claim 1, further comprising:
   creating a message object that represents the first message; and
   storing information about the second and third messages in the message object that represents the first message.

10. A computer program product for generating a dynamic attack on a device under analysis (DUA) by applying the attack to an exchange of a series of related messages with the DUA according to a communication protocol, the computer program product comprising a non-transitory computer-readable medium containing computer program code for performing a method, the method comprising:
   determining a set of one or more variants that exist in the exchange of related messages, wherein the exchange of related messages comprises at least first, second and third related messages according to the communications protocol, the first message being sent to the DUA, the second message being a response from the DUA to the first message, and the third message being sent to the DUA and depending, at least in part, on the content of the second message, and wherein each variant of the set of one or more variants describes a target message field and a mutation to apply to the target message field;
   identifying the first message, wherein the first message is to be sent to the DUA;
   determining whether the first message supports a first variant selected from the set of one or more variants;
   conditioned upon determining that the first message does not support the first variant, sending the first message to the DUA;
   in response to the first message, receiving the second message from the DUA;
   after receiving the second message, identifying the third message to the DUA that responds to the second message according to the communication protocol, the content of the third message depending, at least in part, on content of the second message;
   determining whether the third message supports the first variant; and
   conditioned upon determining that the first message did not support the first variant and that the third message does support the first variant, mutating the third message according to the first variant to produce a third mutated message; and
   sending to the DUA the third mutated message.

11. The computer program product of claim 10, wherein the third message is represented by a message object.

12. The computer program product of claim 11, wherein the message object stores a set of one or more variants that are supported by the third message.

13. The computer program product of claim 12, wherein determining whether the third message supports the first variant comprises querying the message object.

14. The computer program product of claim 11, wherein the message object supports an output method that returns a serialized version of the third message represented by the message object.

15. The computer program product of claim 11, wherein mutating the third message according to the first variant comprises
modifying an output method supported by the message object.

16. The computer program product of claim 10, wherein the method further comprises:
creating a message object that represents the first message; and
storing information about the second and third messages in the message object that represents the first message.

17. An apparatus for generating a dynamic attack a device under analysis (DUA) by applying the attack to an exchange of a series of related messages with the DUA according to a communication protocol, the exchange of related messages including at least a first message sent by the apparatus to a device under test (DUA), a second message sent in response to the first message by the DUA, and a third message sent in response to the second message by the apparatus, the content of the third message depending at least in part on content of the second message, the apparatus comprising:
a mutation point module stored in at least one non-transitory computer-readable medium, the mutation point module configured to determine a set of one or more variants that exist in the exchange of messages, wherein each variant in the set of one or more variants describes a target message field and a mutation to apply to the target message field; and
a message exchange module stored in the at least one non-transitory computer-readable medium and in communication with the mutation point module, the message exchange module configured to apply the dynamic attack to the exchange of related messages, wherein applying the dynamic attack comprises:
identifying the first message that is to be sent to the DUA;
determining whether the first message supports the first variant;
conditioned upon determining that the first message does not support the first variant, sending the first message to the DUA;
in response to the first message, receiving the second message from the DUA;
after receiving the second message, identifying the third message to the DUA;
determining whether the third message supports the first variant;
conditioned upon determining that the first message did not support the first variant and that the third message does support the first variant, mutating the third message according to the first variant to produce a third mutated message; and
sending to the DUA the third mutated message.

18. The apparatus of claim 17, further comprising a message object stored in a non-transitory computer readable medium, accessible to at least one of the mutation point module and the message exchange module, the message object representing the first message.

19. The apparatus of claim 18, wherein the message object that represents the first message also stores information about the second and third messages.

20. The apparatus of claim 19, wherein the message object supports an output method that returns a serialized version of the third message represented by the message object.

21. The apparatus of claim 20, wherein mutating the third message is performed by modifying the output method.

22. A method for using a dynamic security analyzer to generate a dynamic attack on a device under analysis (DUA) by applying the attack to an exchange of related messages according to a communication protocol, the method comprising:
determining with the security analyzer a set of one or more variants that exist in the exchange of related messages according to the communication protocol, wherein each variant of the set of one or more variants describes a target message field and a mutation to apply to the target message field, wherein the exchange of related messages comprises successive outgoing and incoming messages, wherein the outgoing messages are to be sent to the DUA and wherein the incoming messages are received from the DUA in response to the outgoing messages according to the communication protocol;
determining whether each outgoing message selected from the successive outgoing and incoming messages supports a first variant selected from the set of one or more variants;
while each successive outgoing message selected from the successive outgoing and incoming messages does not support the first variant, sending the respective outgoing message to the DUA;
responsive to an outgoing message that supports the first variant being identified from the successive outgoing and incoming messages:
mutating the identified outgoing message according to the first variant to produce a mutated outgoing message; and
sending, with the security analyzer, the mutated outgoing message to the DUA.

23. The method of claim 22, wherein the outgoing messages are each represented by a message object.

24. The method of claim 23, wherein the message object supports an output method that returns a serialized version of a message represented by the message object, and wherein mutating is performed by modifying the output method.

25. A computer program product for generating and applying a dynamic attack on a device under analysis (DUA) by applying the attack to an exchange of related messages according to a communication protocol, the computer program product comprising a non-transitory computer-readable medium containing computer program code for performing a method, the method comprising:
determining a set of one or more variants that exist in the exchange of related messages according to the communication protocol, wherein each variant of the set of one or more variants describes a target message field and a mutation to apply to the target message field, wherein the exchange of related messages comprises successive outgoing and incoming messages, wherein the outgoing messages are to be sent to the DUA and wherein the incoming messages are received from the DUA in response to the outgoing messages according to the communication protocol;

determining whether each outgoing message selected from the successive outgoing and incoming messages supports a first variant selected from the set of one or more variants;

while each successive outgoing message selected from the successive outgoing and incoming messages does not support the first variant, sending the outgoing message to the DUA;

responsive to an outgoing message that supports the first variant being identified from the successive outgoing and incoming messages:

mutating the identified outgoing message according to the first variant to produce a mutated outgoing message; and sending the mutated outgoing message to the DUA.

26. The computer program product of claim 25, wherein the outgoing messages are each represented by a message object.

27. The computer program product of claim 26, wherein the message object supports an output method that returns a serialized version of a message represented by the message object, and wherein mutating is performed by modifying the output method.

28. An apparatus for generating and applying a dynamic attack on a device under analysis (DUA) by applying the attack to an exchange of related messages according to a communication protocol, the exchange of related messages comprising successive outgoing and incoming messages, wherein the outgoing messages are to be sent to the DUA and wherein the incoming messages are received from the DUA in response to the outgoing messages according to the communication protocol, the apparatus comprising:

a mutation point module stored in at least one non-transitory computer-readable medium, the mutation point module configured to determine a set of one or more variants that exist in the exchange of related messages according to the communication protocol, wherein each variant of the set of one or more variants describes a target message field and a mutation to apply to the target message field;

a message exchange module stored in the at least one non-transitory computer readable medium and in communication with the mutation point module, the message exchange module configured to apply the dynamic attack to the exchange of related messages, wherein applying the dynamic attack comprises:

determining whether each outgoing message selected from the successive outgoing and incoming messages supports a first variant selected from the set of one or more variants;

while each successive outgoing message selected from the successive outgoing and incoming messages does not support the first variant, sending the outgoing message to the DUA;

responsive to an outgoing message that supports the first variant being identified from the successive outgoing and incoming messages:

mutating the identified outgoing message according to the first variant to produce a mutated outgoing message; and sending the mutated outgoing message to the DUA.

29. The apparatus of claim 28, wherein the outgoing messages are each represented by a message object.

30. The apparatus of claim 29, wherein the message object supports an output method that returns a serialized version of a message represented by the message object, and wherein mutating is performed by modifying the output method.

* * * * *

UNITED STATES PATENT AND TRADEMARK OFFICE
CERTIFICATE OF CORRECTION

PATENT NO.         : 8,250,658 B2
APPLICATION NO.    : 11/858779
DATED              : August 21, 2012
INVENTOR(S)        : Adam Bozanich et al.

Page 1 of 1

It is certified that error appears in the above-identified patent and that said Letters Patent is hereby corrected as shown below:

In the Claims:

At column 15 Claim no. 17 line nos. 24-65 make the following amendments:

17. An apparatus for generating a dynamic attack on a device under analysis (DUA) by applying the attack to an exchange of a series of related messages with the DUA according to a communication protocol, the exchange of related messages including at least a first message sent by the apparatus to a device under [[test]] analysis (DUA), a second message sent in response to the first message by the DUA, and a third message sent in response to the second message by the apparatus, the content of the third message depending at least in part on content of the second message, the apparatus comprising:
  a mutation point module stored in at least one non-transitory computer-readable medium, the mutation point module configured to determine a set of one or more variants that exist in the exchange of messages, wherein each variant in the set of one or more variants describes a target message field and a mutation to apply to the target message field; and
  a message exchange module stored in the at least one non-transitory computer-readable medium and in communication with the mutation point module, the message exchange module configured to apply the dynamic attack to the exchange of related messages, wherein applying the dynamic attack comprises:
  identifying the first message that is to be sent to the DUA;
  determining whether the first message supports the first variant;
  conditioned upon determining that the first message does not support the first variant, sending the first message to the DUA;
in response to the first message, receiving the second message from the DUA;
after receiving the second message, identifying the third message to the DUA;
determining whether the third message supports the first variant;
conditioned upon determining that the first message did not support the first variant and that the third message does support the first variant, mutating the third message according to the first variant to produce a third mutated message; and
sending to the DUA the third mutated message.

Signed and Sealed this
Thirteenth Day of August, 2013

Teresa Stanek Rea
*Acting Director of the United States Patent and Trademark Office*